United States Patent [19]

Skyba

[11] Patent Number: 4,716,653
[45] Date of Patent: Jan. 5, 1988

[54] TREE SAW WITH EXTENSION ATTACHMENT

[76] Inventor: Helmut K. Skyba, Rte. 2, Box 330, Wild Rose, Wis. 54984

[21] Appl. No.: 911,525

[22] Filed: Sep. 25, 1986

[51] Int. Cl.[4] .............................................. B26B 27/00
[52] U.S. Cl. ................................. 30/296 R; 30/166 R; 30/314; 30/155; 16/DIG. 25; 403/341
[58] Field of Search ................. 76/101 D, 112, 101 C; 403/393, 341; 30/90, 155, 231, 296 R, 166 R, 280, 298, 312, 314, 144; 74/544, 546; 16/115, DIG. 24, DIG. 41, DIG. 25, DIG. 40; 7/118, 148, 167, 168; 15/143 B, 144 B; 248/37.3; 42/86

[56] References Cited

U.S. PATENT DOCUMENTS 930,183  8/1909  Jenkins .................................. 30/314

FOREIGN PATENT DOCUMENTS 166973  3/1950  Austria ................................. 30/155
444702  10/1912  France ................................. 403/393

Primary Examiner—Paul A. Bell
Assistant Examiner—Scott A. Smith
Attorney, Agent, or Firm—Fuller, Puerner & Hohenfeldt

[57] ABSTRACT

A tree saw uses a flexible sapling or tree limb as a handle extension to permit a person to cut tree branches beyond his normal reach. The tree saw comprises a foldable saw having a pair of swingable rings mounted to the back of the saw handle. A fulcrum is secured to the handle back surface intermediate the rings. The limb is inserted through the rings and over the fulcrum. The limb is bent into a concave shape. One of the rings is swung along the limb as far as possible. When the limb is released, its natural elasticity tends to straighten it and thereby force it into tight and rigid connection with the rings and fulcrum.

11 Claims, 7 Drawing Figures

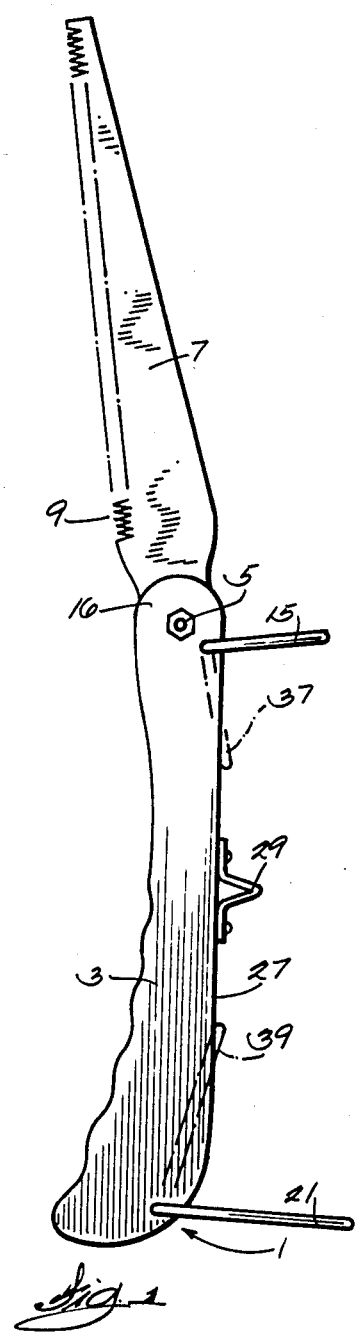
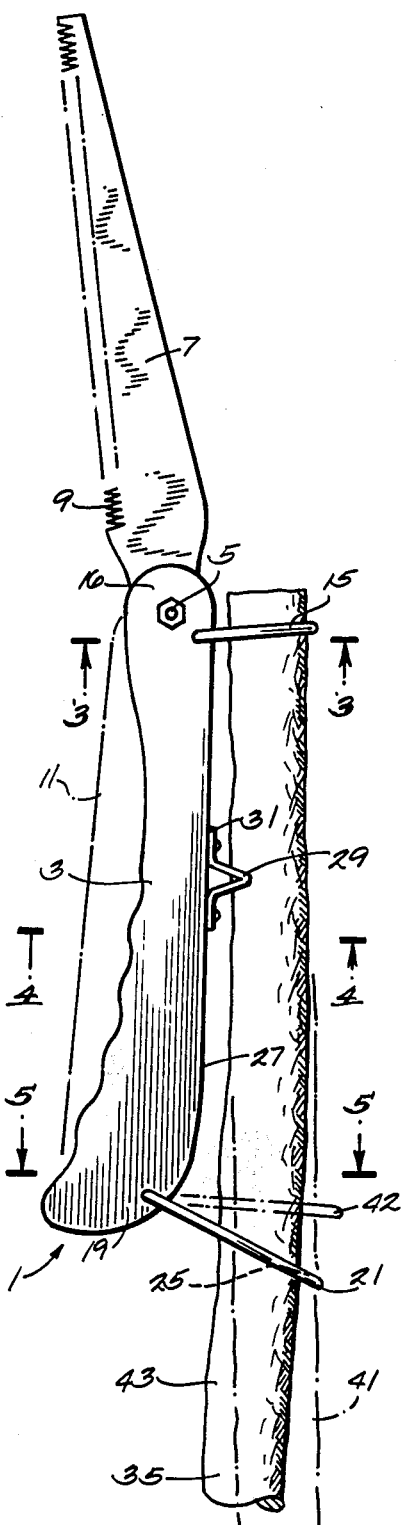
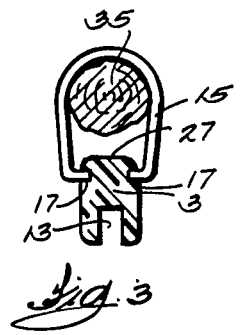
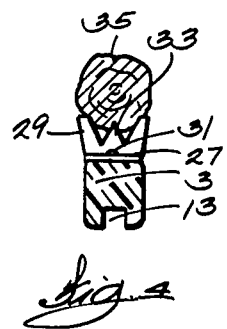
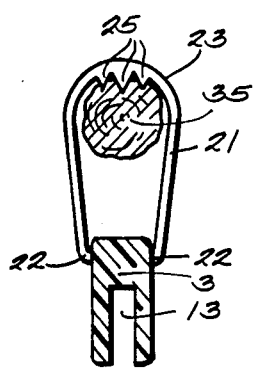

4,716,653

TREE SAW WITH EXTENSION ATTACHMENT

BACKGROUND OF THE INVENTION

1. Field of the Invention

This invention pertains to hand tools, and more particularly to apparatus for manually trimming trees and shrubs.

2. Description of the Prior Art

Deer hunters, especially bow hunters, frequently wait in tree stands for game to pass by. A problem with using most trees as hiding places is that leaves and branches often obscure at least a portion of the view of the surrounding area. The hunter must then search for a different tree or be content with an incomplete field of view. Another alternative is to break the leaves and branches from the tree, but that is a difficult and time consuming task. While it is possible to saw the branches, it is inconvenient and cumbersome to carry a conventional saw into the woods along with the regular hunting gear. Further, the branches blocking the view may well be beyond the safe reach of an ordinary hand saw. Thus, a need exists for a tool that quickly and conveniently removes tree branches from a hunter's line of sight.

SUMMARY OF THE INVENTION

In accordance with the present invention, a tree saw is provided that safely and quickly cuts tree branches beyond a person's normal reach. This is accomplished by apparatus that includes a hand saw having attached thereto a pair of rings and a toothed fulcrum adapted to retain an elastic handle extension.

The hand saw may be of the folding type wherein the blade pivots into the handle for safe carrying. The first ring is swingably attached to the handle near the blade connection end. The second ring is swingably attached at the handle free end. The rings are sized with approximately one inch openings. About half way between the two rings is fastened an upstanding sharp toothed fulcrum that projects a short distance above the back surface of the handle.

The tree saw of the present invention is used with an elastic handle extension that permits cutting objects beyond a person's safe reach. Specifically, the tree saw is used in conjunction with a flexible and elastic tree limb or sapling having a diameter that is insertable through the two rings. The limb is inserted through the second ring at the handle free end, over the fulcrum, and then through the first ring. To accomplish limb insertion, the two rings are swung into planes that are approximately perpendicular to the plane of the back of the tree saw handle. With the limb in place in the rings, the hunter or other person using the tree saw bends the limb by placing one hand at the first ring and the second hand on the limb beyond the second ring. The hunter bends the limb such that the tree saw is on the concave side of the limb, and the limb is forced into the toothed fulcrum. With the limb bent, the second ring is swung along the limb toward the handle free end, so that the ring is not perpendicular to the handle. Upon relaxation of the limb by the hunter, the limb elastic restoring force causes it to be tightly gripped by the rings and the fulcrum. To enhance the gripping ability of the second ring, the inside surface thereof may be provided with sharp teeth.

With the limb rigidly attached to the tree saw, the tree saw may be used to reach and cut tree branches beyond a hunter's normal reach. After use, the limb extension is easily removed from the tree saw of the present invention by again bending the limb against the fulcrum to relieve the force on the second ring teeth. The second ring is then swung to the perpendicular position relative to the saw handle back surface. The limb is then pulled from the two rings.

Other aims and advantages of the invention will become apparent to those skilled in the art upon reading the detailed description.

BRIEF DESCRIPTION OF THE DRAWINGS

FIG. 1 is a front view of the tree saw of the present invention in the open configuration;

FIG. 2 is a front view of the present invention with a handle extension in place on the tree saw;

FIG. 3 is a cross sectional view taken along lines 3—3 of FIG. 2 and rotated 90° counterclockwise;

FIG. 4 is a cross sectional view taken along lines 4—4 of FIG. 2 and rotated 90° counterclockwise;

FIG. 5 is a cross sectional view taken along lines 5—5 of FIG. 2 and rotated 90° counterclockwise.

DETAILED DESCRIPTION OF THE INVENTION

Figure 7:
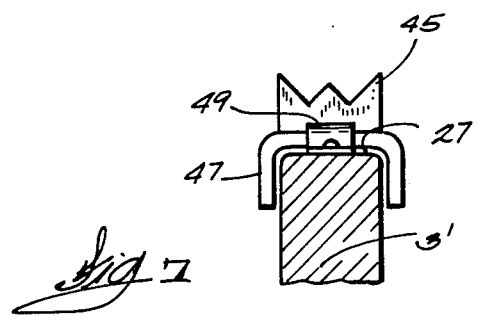
FIG. 7 is a view taken along lines 7—7 of FIG. 6.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIGS. 1 and 2, a tree saw 1 is illustrated that includes the present invention. The tree saw is particularly useful for pruning branches from a hunter's tree stand, but it will be understood that the invention is not limited to sporting applications.

The tree saw 1 includes a handle 3. To one end of the handle 3 is pivotally connected, as by a suitable pin connection 5, a blade 7. The blade 7 is provided with a series of teeth 9 that are spaced, sharpened, and set for sawing green wood. The blade is pivotable around the pin connection 5 between the open configuration as shown by the solid lines of FIGS. 1 and 2 and a closed configuration as indicated by phantom line 11 of FIG. 2. As shown in FIGS. 1-5, the folded blade fits within a channel 13 that extends longitudinally for the length of the handle.

In accordance with the present invention, the tree saw 1 comprises a first ring 15 that is attached to the handle 3 near the handle blade end 16. The first ring 15 is attached such that it is swingable over the handle back surface 27. As best shown in FIG. 3, the first ring is generally U-shaped with a pair of inwardly turned ends 17 that are swingably received within suitable openings in the handle. The preferred diameter of the first ring is approximately 1".

To the free end 19 of the handle 3 is mounted a second ring 21. Like the first ring, the second ring 21 is generally U-shaped and is formed with inturned ends 22 for being swingably received within suitable openings in the handle for swinging over the handle back surface 27. The second ring is somewhat different than the first ring. In addition, the inside surface of the circular portion 23 of the second ring is fabricated with sharp teeth 25.

At the approximate mid-point of the handle back surface 27 is secured a fulcrum 29. Securing may be by any suitable means, such as rivets 31. As shown in FIG. 4, the fulcrum is manufactured with sharp teeth 33.

The tree saw 1 is used with an extension handle 35 to permit sawing tree branches beyond a person's normal reach. Hunters find the tree saw of the present invention especially useful in combination with a handle extension 35 comprising a flexible and elastic tree limb or sapling. Normally, the tree saw is carried in the hunter's pocket or pack with the blade 7 folded, as shown by phantom line 11. The rings 15 and 21 are also folded against the handle back surface 27, as shown by phantom line 37 and 39, respectively in FIG. 1. Upon reaching his observation post, the hunter procures a limb or sapling 35 of a diameter suitable for insertion through the rings. The two rings are swung to the upstanding position, wherein they are approximately perpendicular to the handle back surface, as shown at 15 and at phantom lines 42 of FIG. 2. The limb is inserted, or the tree saw is slipped over the limb, first through the second ring, over the fulcrum 29, and through the first ring. The dimensions of the two rings and fulcrum are chosen to permit easy insertion of a limb having a diameter a little less than 1". Phantom line 41 in FIG. 2 shows the limb inserted through the rings and over the fulcrum.

The hunter then grasps the blade end 16 of the handle 3, together with the adjacent portion of the limb 35, with one hand. With the other hand, he grasps the limb beyond the handle free end 19. He bends the limb into a concave shape, as indicated by outline 43 of FIG. 2. Simultaneously, he uses the thumb of the hand grasping the handle blade end to force the fulcrum teeth 33 into the limb. With the limb bent to the concave shape of outline 43, the second ring is swung backwardly along the limb as far as possible, as indicated by the position of the ring 21 of FIG. 2. Finally, the hunter relaxes his bending efforts. The natural elasticity of the limb attempts to restore it to the straightened condition, thereby forcing the limb into tight penetration with the teeth 25 on the second ring and with the fulcrum teeth. The limb thereby creates a handle extension rigidly connected to the tree saw handle. The blade 7 is then opened, and the tree saw is ready for pruning trees and branches that would normally be very difficult or even inaccessible to reach. When finished pruning, the hunter closes the blade 7. He bends the limb sufficiently so that it is removable from the ring teeth 25. The second ring is swung to a perpendicular position relative to the handle back surface 27. The limb is then relaxed completely, restoring it to the originally straight configuration of phantom line 41. The limb is then easily pulled from the tree saw 1.

Figure 6:
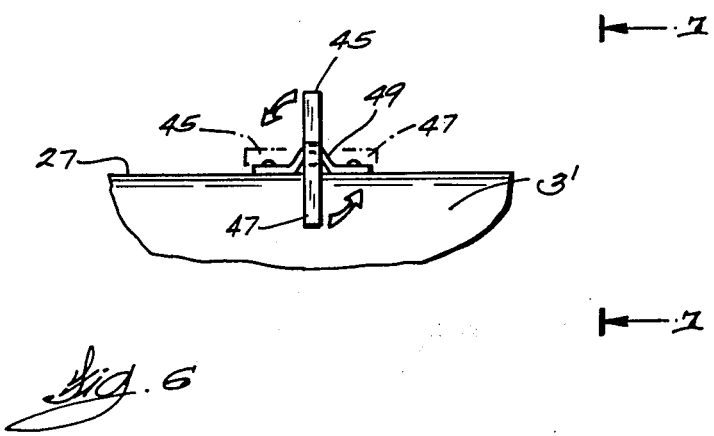
FIG. 6 is a side view of a modified fulcrum according to the present invention.

It will be recognized that numerous variations of the tree saw 1 of the present invention are possible. For example, the rings 15 and 21 may be attached to the handle 3 by means of separate brackets that are fastened to the handle. The brackets may be designed for fastening in a manner that enables a conventional saw to be converted into the tree saw of the present invention. Further, the fulcrum 29 may be produced with a fold-over tooth arrangement, such as is shown in FIGS. 6 and 7, wherein the teeth 45 are attached to and swing with a U-shaped rod 47 that is retained by a clip 49 fastened to the back surface 27 of the handle 3' to permit the fulcrum teeth to be folded safely against the handle back surface 27 when the tree saw is not in use.

Thus, it is apparent that there has been provided, in accordance with the invention, a tree saw with a handle extension that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The tree saw can be conveniently used by those engaged in a wide variety of activities such as back packers, campers, hunters and home pruning.

I claim:

1. A tree saw for pruning tree branches comprising:
   a. a handle having two ends;
   b. a toothed blade connected to one end of the handle;
   c. a first ring mounted to the handle near the connection thereof with the blade;
   d. a second ring swingably mounting to the handle near the other end thereof; and
   e. a fulcrum secured to and upstanding from the handle between the first and second rings, the fulcrum and rings cooperating to grip and hold an elastic handle extension rigidly to the fulcrum with the handle extension pressed against the fulcrum,
   so that the tree saw is capable of pulling branches beyond a person's normal reach.

2. The tree saw of claim 1 wherein:
   a. the handle is formed with a channel extending the length of the handle;
   b. the blade is pivotable between an open configuration and a closed configuration wherein the blade fits within the channel; and
   c. the first and second rings and the fulcrum are mounted adjacent the back surface of the handle opposite the channel.

3. The tree saw of claim 2 wherein the fulcrum and inside surface of the second ring have means defining sharp teeth for penetrating the handle extension for holding it securely to the tree saw.

4. The tree saw of claim 1 wherein the fulcurm is swingable to a folded position against the handle axe surface when the fulcrum is not in use with a handle extension.

5. Apparatus for pruning branches of trees and shrubs comprising:
   a. an elongated toothed blade;
   b. a handle having a first end pivotally connected to one end of the toothed blade and second free end, the handle having a longitudinal channel for receiving the blade and a back surface opposite the channel;
   c. a first ring mounted to the handle near the pivotal connection with the blade and over the handle back surface;
   d. a second ring mounted to the handle at the free end thereof and adapted to swing over the handle back surface;
   e. a fulcrum mounted to the handle back surface between the two rings; and
   f. an elongated flexible and elastic handle extension inserted through the rings and over the fulcrum, the handle extension being bendable into a concave shape to permit the second ring to be swung along the handle extension toward the handle free end, so that when the handle extension is relaxed the natural elasticity thereof attempts to restore it to the straight configuration and thereby forces it into tight contact with the rings and fulcrum to form a rigid extension of the handle.

6. The apparatus of claim 5 wherein the fulcrum is secured to the handle approximately midway between the two rings, and wherein the fulcrum is formed with teeth for penetrating into the handle extension.

7. The apparatus of claim 5 wherein the inside surface of the second ring is formed with teeth for penetrating the handle extension.

8. The apparatus of claim 5 wherein the handle extension is a tree limb or sapling.

9. The apparatus of claim 5 wherein the first and second rings are swingable between first respective positions approximately perpendicular to the handle back surface and second respective positions folded against the handle back surface.

10. A method of producing apparatus capable of pruning tree branches beyond a person's normal reach comprising the steps of:

a. providing a tree saw having a handle, a toothed blade connected to the handle, a pair of spaced swingable rings mounted to the handle, and a fulcrum secured to the handle intermediate the rings;

b. providing an elongated flexible and elastic handle extension;

c. inserting the handle extension through the handle rings and over the fulcrum;

d. bending the handle extension into a concave shape with the handle being on the concave side of the handle extension;

e. swinging at least one ring along the bent handle extension in a direction away from the other ring; and f. relaxing the handle extension to allow it to return to its unbent shape, so that the handle extension is tightly gripped by the rings and fulcrum to thereby form a rigid extension to the tree saw handle.

11. The method of claim 10 wherein the step of providing an elongated, flexible and elastic handle extension includes the step of providing an elongated, flexible and elastic tree limb or sapling.

* * * * *